United States Patent
Ahn et al.

(10) Patent No.: US 6,785,935 B2
(45) Date of Patent: Sep. 7, 2004

(54) HINGE DEVICE FOR CAMERA-EQUIPPED MOBILE PHONES AND MOBILE PHONE HAVING SUCH DEVICE

(75) Inventors: Ho-Sik Ahn, Suwon-si (KR); Hyung-Suk Kim, Suwon-si (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 30 days.

(21) Appl. No.: 10/397,717

(22) Filed: Mar. 26, 2003

(65) Prior Publication Data

US 2004/0107537 A1 Jun. 10, 2004

(30) Foreign Application Priority Data

Dec. 10, 2002 (KR) .................................. 10-2002-0078441

(51) Int. Cl.$^7$ .......................... E05D 15/28; H04M 1/00
(52) U.S. Cl. .......................... 16/221; 16/354; 16/242; 16/250; 379/433.13; 455/575.3
(58) Field of Search ........................... 16/221, 235, 242, 16/243, 250, 261, 265, 266, 312, 325, 354, 376; 379/433.11–433.13, 434, 433, 428; 361/680–683, 801–804; 455/556, 575, 575.3, 90, 90.3

(56) References Cited

U.S. PATENT DOCUMENTS

| | | | |
|---|---|---|---|
| 6,628,974 B1 | * 9/2003 | Lim ...................... | 379/433.11 |
| 6,700,784 B2 | * 3/2004 | Huang et al. ................ | 361/715 |
| 2001/0036265 A1 | * 11/2001 | Oh ......................... | 379/433.01 |
| 2002/0025787 A1 | * 2/2002 | Lee ............................. | 455/90 |
| 2003/0040330 A1 | * 2/2003 | Kim et al. .................. | 455/550 |
| 2003/0109232 A1 | * 6/2003 | Park et al. .................... | 455/90 |
| 2003/0125079 A1 | * 7/2003 | Park et al. .................. | 455/556 |
| 2003/0227564 A1 | * 12/2003 | Lim ........................... | 348/375 |

FOREIGN PATENT DOCUMENTS

JP    2003-309756    * 10/2003

* cited by examiner

Primary Examiner—Robert J. Sandy
Assistant Examiner—Andre' L. Jackson
(74) Attorney, Agent, or Firm—Gottlieb, Rackman & Reisman, P.C.

(57) ABSTRACT

The object of this invention is to provide a hinge device for camera-equipped mobile phones, and a mobile phone having such a hinge device. The hinge device allows the fold of a mobile phone to be automatically opened or closed relative to the main body, and allows automatic rotation of a digital camera of the phone. The hinge device includes a fixed hinge part (130), a rotary hinge part (110), a power generating means provided in the fold to generate a rotating drive force, an internal rotor (106) provided in the rotary hinge part, a camera (104) provided in the internal rotor, a rotation stop means for stopping rotation of the internal rotor and rotating the rotary hinge part using the rotating drive force, and a power transmission means connected to both the power generating means and the fixed hinge part to selectively perform power transmission.

40 Claims, 9 Drawing Sheets

HINGE DEVICE FOR CAMERA-EQUIPPED MOBILE PHONES AND MOBILE PHONE HAVING SUCH DEVICE

TECHNICAL FIELD

The present invention relates, in general, to a hinge device for camera-equipped mobile phones and, more particularly, to a hinge device for such camera-equipped mobile phones, which is designed, to allow the fold of a mobile phone to be automatically opened or closed relative to the main body, and allow automatic rotation of a digital camera of the phone. The present invention also relates to a mobile phone having such a hinge device.

BACKGROUND ART

As well known to those skilled in the art, conventional mobile phones are classified into flip-type phones with a hinged cover covering a variety of buttons of a main body, and folding-type phones with a folding main body. In accordance with the recent trend toward smallness and compactness of mobile phones, the folding-type phones have become more widely used than the flip-type phones.

In a conventional folding-type mobile phone, a fold is hinged to a main body such that the fold is rotated toward or away from the main body to be closed or opened.

The conventional folding-type mobile phones are typically provided with a manual fold rotating mechanism designed to allow a user to manually open or close the fold relative to the main body. Nowadays, some models with a motor-operated fold rotating mechanism capable of automatically opening or closing the fold relative to the main body using a motor as well as allowing a user to manually open or close the fold as desired to enhance the convenience to users and functions of the phones have been proposed and used.

FIG. 1 shows a part of a conventional folding-type mobile phone equipped with such a motor-operated fold rotating mechanism to allow a user to manually or automatically open or close the fold. As shown in the drawing, the conventional folding-type mobile phone comprises a fold 1 and a main body 2 which are connected to each other using a hinge device.

The hinge device comprises a rotary hinge part 10 provided at the fold 1, and two fixed hinge parts 30 provided at the main body 2. The rotary hinge part 10 is hinged at both ends thereof to the two fixed hinge parts 30.

The motor-operated fold rotating mechanism is set in the hinge device to automatically open or close the fold 1 relative to the main body 2 as desired. The motor-operated fold rotating mechanism comprises a power generating means installed in the rotary hinge part 10 to generate a rotating drive force, a power transmission means for selectively engaging with the power generating means, and an elastic support means for applying an elastic biasing force to the power transmission means to selectively engage or disengage the power transmission means with or from the power generating means in response to an external force applied to the fold 1 by a user. The motor-operated fold rotating mechanism also has a position sensing means for sensing an angular position of the rotary hinge part 10 and outputting a control signal to the power generating means.

The power generating means generates a rotating drive force to rotate the fold 1 relative to the main body 2 in either direction, and comprises a motor 11, and a reduction gear assembly 12 for transmitting the rotating drive force of the motor 11 while lowering the rotating speed.

In a detailed description, the motor 11 is connected to a signal output means (not shown) externally provided at a predetermined position of the main body 2, and is turned on by electricity applied from a battery of the mobile phone in response to a signal outputted from the signal output means. The motor 11 thus generates an opposite directional rotating force.

The reduction gear assembly 12 is assembled with the output shaft of the motor 11, and transmits the rotating drive force of the motor 11 to the power transmission means while lowering the rotating speed it a predetermined ratio. The reduction gear assembly 12 comprises a plurality of planetary gears (not shown). In the reduction gear assembly 12, the planetary gears are assembled to have a predetermined reduction ratio, and function to prevent undesired reverse rotation of the reduction gear assembly 12, in addition to lowering the rotating speed.

The power transmission means comprises a first cam member 22 and a second cam member 23. The first cam member 22 connected to the reduction gear assembly 12 is tapered at an end thereof such that the central portion of the end of the first cam member 22 becomes flat and projects toward the second cam member 23, thus forming a tapered projection. The second cam member 23 has a depression tapered at opposite side surfaces thereof. During an automatic fold rotating mode of the hinge device, the first and second cam members 22 and 23 come into frictional engagement with each other due to the elastic biasing force of the elastic support means. When the power generating means generates a rotating force during the automatic fold rotating mode, the first cam member 22 is rotated in the same direction as that of the power generating means. The second cam member 23 is thus rotated in the same direction since the two cam members 2 and 23 frictionally engage with each other. However, when a user manually opens or closes the fold 1, and applies an external force to the fold 1 when the motor-operated fold rotating mechanism is maintained in the automatic fold rotating mode, the first and second cam members 22 and 23 disengage from each other.

In the power transmission means, the first cam member 22 is mounted to an end of the shaft of the reduction gear assembly 12, while the second cam member 23 is seated in a cavity formed in one of the two fixed hinge parts 30.

The elastic support means comprises a compression spring 40 made of a material having both high elastic strain and high restoring force. The compression spring 40 is set in the cavity of the fixed hinge part 30 such that a first end of the spring 40 is connected to an end wall of the cavity, and a second end is connected to an end of the power transmission means.

The elastic biasing force of the elastic support means is higher than the rotating drive force of the power generating means. Since the elastic support means having such a high elastic biasing force biases the power transmission means in a direction, the first and second cam members 22 and 23 of the power transmission means engage with or disengage from each other.

That is, when the fold 1 is opened or closed by the rotating drive force of the power generating means, the compression spring 40 applies its elastic biasing force higher than the rotating drive force of the power generating means to the power transmission means, thus maintaining the frictional engagement of the first and second cam members 22 and 23. However, when the user manually opens or closes the fold 1, the compression spring 40 is elastically deformed to allow the fold 1 to be manually opened or closed.

The position sensing means controls the power generating means to compensate for an angular phase difference of 30° relative to a rotating angle range of 0°~150° of the fold 1 relative to the main body.

That is, when the rotary hinge part 10 is positioned at the same angular phase as the power transmission means, the position sensing means senses the angular position of the rotary hinge part 10, and outputs a stop signal to the power generating means to stop the operation of the power generating means.

The position sensing means comprises position sensors selected from conventional magnetic sensors or photo sensors capable of outputting electric signals in accordance with an alignment of separate sensors. The position sensing means also may comprise a contact switch designed to output an electric signal to the power generating means when contacts of the contact switch come into contact with each other.

The above-mentioned hinge device for the mobile phones is operated as follows.

When a user manually rotates the fold 1 in either direction to open or close the fold 1 relative to the main body 2, the rotary hinge part 10 is rotated in the same direction in cooperation with the rotation of the fold 1.

In such a case, a manual rotating force applied to the rotary hinge part 10 by the user is higher than the elastic biasing force of the compression spring 40, the first and second cam members 22 and 23 slip off to disengage from each other.

That is, the second cam member 23 biased at an end thereof by the compression spring 40 is designed to selectively come into frictional engagement with the first cam member 22 mounted to the shaft of the reduction gear assembly 12. Therefore, when an external force is applied to the fold 1 by the user to manually open or close the fold 1, the first and second cam members 22 and 23 slip off to disengage from each other since the external force acting on the fold 1 is higher than the elastic biasing force of the compression spring 40. The power transmission means retracts after compressing the compression spring 40, so it is possible for the user to manually open or close the fold 1.

When the user wants to automatically open the fold 1, the user manipulates the signal output means of the main body 2. The signal output means thus outputs an electric signal to the power generating means;

In response to the signal outputted from the signal output means, the motor 11 of the power generating means is turned on by electricity applied from the battery of the mobile phone, thus being rotated in a direction and generating a desired directional rotating force capable of automatically opening the fold 1. The rotating force of the motor 11 is transmitted to the first cam member 22 mounted to the end of the shaft of the reduction gear assembly 12.

In such a case, the first and second cam members 22 and 23 are returned from their rotated positions, where the two cam members 22 and 23 are rotated at a predetermined angle to compress the compression spring 40, to their original positions by the restoring force of the compression spring 40.

In the above state, the first cam member 22 is rotated by the rotating force of the motor 11 under the condition that the first cam member 22 frictionally engages with the second cam member 23 of the fixed hinge part 30. Since the elastic biasing force of the compression spring 40 in the above state is higher than the drive force applied from the motor 11, the frictional engaging state of the first and second cam members 22 and 23 is maintained.

Since the second cam member 23 is mounted to the fixed hinge part 30, the first cam member 22 connected to the second cam member 23 is maintained at a fixed position. Since the first cam member 22 is maintained at the fixed position as described above, the rotating force of the motor 11 rotates the rotary hinge part 10 fixedly housing the motor 11. The fold 1 integrated with the rotary hinge part 10 is thus rotated in the same direction as that of the rotary hinge part 10, so the fold 1 is opened.

When the position sensor internally provided on the rotary hinge part 10 is aligned with the position sensor externally provided on the first cam member 22 during rotation of the rotary hinge part 10, the two position sensors have the same angular phase. In such a case, a predetermined electric signal is applied to the motor 11 to stop the rotation of the motor 11. The rotation of the fold 1 is stopped, so the opening action of the fold 1 is stopped.

When the user wants to automatically close the fold 1, the user manipulates the signal output means of the main body 2, so the signal output means outputs an electric signal to the motor 11 of the power generating means.

In response to the signal outputted from the signal output means, the motor 11 is turned on by electricity applied from the battery of the mobile phone to be rotated in a reverse direction, thus generating a reverse rotating force capable of closing the fold 1. The rotating force of the motor 11 is transmitted to the first cam member 22 mounted to the end of the shaft of the reduction gear assembly 12.

In such a case, the first and second cam members 22 and 23 are maintained at a frictional engaging position wherein the two cam members 22 and 23 frictionally engage with each other by the elastic biasing force of the compression spring 40, so the power transmission means comprising the first and second cam members 22 and 23 is fixed in their positions.

Due to the fixed position of the power transmission means, the rotary hinge part 10 fixedly housing the motor 11 is rotated in the reverse direction.

The fold 1 integrated with the rotary hinge part 10 is thus rotated in the same direction as the rotary hinge part 10 to be closed.

When the fold 1 is completely closed, the fold 1 comes into contact with the rain body 2, so the rotation of the fold 1 is stopped. Due to the stopping of the rotation of the fold 1, the motor 11 is overloaded.

In such a case, the overload is higher than the elastic biasing force of the compression spring 40, so the first and second cam members 22 and 23 slip off to disengage from each other. In addition, the motor 11 is moved to compress the compression spring 40.

Therefore, the first cam member 22 is rotated due to the rotating force of the motor 1. When the position sensor externally provided on the first cam member 22 is aligned with the position sensor internally provided on the rotary hinge part 10 during rotation of the first cam member 22, the two position sensors have the same angular phase. In such a case, a predetermined electric signal is applied to the motor 11 to stop the rotation of the motor 11. The rotation of the fold 1 to be closed is stopped, so the closing action of the fold 1 is stopped.

In recent years, there have been proposed and widely used camera-equipped mobile phones which are interiorly or exteriorly equipped with digital cameras to allow users to transmit images and sound with call-connected counterparts through the mobile phones.

A conventional external digital camera for mobile phones is externally attached to the main body of a mobile phone such that a user manually rotates the camera in either direction to make the camera face the user or another target subject opposite to the user to take a photograph of the user or the target subject.

However, the mobile phones having the conventional external digital cameras at their main bodies are problematic in that the camera increases the volume of the phone. In addition, the conventional external digital cameras force users to separately carry the cameras and connect the cameras to their phones when necessary, thus being inconvenient to the users.

In an effort to overcome the problems of the external digital cameras for mobile phones, internal digital cameras set in mobile phones have been proposed and used.

The internal digital cameras are constructed as follows. That is, a cylindrical digital camera is interiorly set in the hinge device which hinges the fold to the main body of a mobile phone, with a camera rotating mechanism installed in the hinge device to automatically rotate the camera. In the operation of the mobile phone with such an internal digital camera, the camera is automatically rotated by a motor. That is, when the fold of the mobile phone is rotated to be open, the camera is automatically rotated in a direction to make the camera face inward (toward the user) or outward (toward another target subject opposite to the user) to take a photograph of the user or the target subject.

The internal digital cameras are advantageous in that they do not increase the volume of mobile phones, and are automatically rotated, thus being convenient to users.

However, the mobile phones with such internal digital cameras are problematic in that the camera rotating mechanism is installed in the hinge device, so the hinge device is not designed to automatically open or close the fold.

That is, due to a limited space inside the hinge device of the mobile phones, it is impossible to separately install two motors for the camera rotating mechanism and the fold rotating mechanism in the hinge device, so the mobile phones having the internal digital cameras do not have the fold rotating mechanism in the hinge device. Therefore, in the prior art, the motor-operated fold rotating mechanism for automatically opening or closing the fold is installed in the hinge device only when the hinge device does not have such an internal digital camera.

Since the conventional hinge device for mobile phones does not house both the camera rotating mechanism and the fold rotating mechanism receive due to its limited internal capacity as described above, the mobile phones do not accomplish the function of automatically opening or closing the fold and the function of automatically rotating the internal digital camera at the same time, thus being inconvenient to users.

DISCLOSURE OF THE INVENTION

Accordingly, the present invention has been made keeping in mind the above problems occurring in the prior art, and an object of the present invention is to provide a hinge device for camera-equipped mobile phones, which is designed to allow the fold of a mobile phone to be automatically opened or closed relative to the main body, and allow automatic rotation of a digital camera of the phone.

Another object of the present invention is to provide a mobile phone having such a hinge device.

In order to accomplish the above objects, the present invention provides a hinge device for connecting a fold and a main body of a camera-equipped mobile phone to each other, comprising: a fixed hinge part provided at the main body; a rotary hinge part provided at the fold and hinged at both ends thereof to the fixed hinge part; a power generating means provided in the fold to generate a rotating drive force; an internal rotor provided in the rotary hinge part to be rotated by the rotating drive force generated by the power generating means; an image pickup device provided in the internal rotor to take a photograph of a target subject; a rotation stop means for stopping rotation of the internal rotor and rotating the rotary hinge part using the rotating drive force of the power generating means; and a power transmission means connected at both ends thereof to the power generating means and the fixed hinge part, respectively, to selectively perform power transmission.

In the hinge device, the power generating means preferably comprises a motor which is rotated in either direction to generate a forward or reverse directional rotating force. The power generating means preferably further comprises a reduction gear assembly connected to the motor so as to transmit the rotating drive force of the motor while lowering a rotating speed.

The reduction gear assembly comprises: a first reduction gear assembly installed in the internal rotor; and a second reduction gear assembly connected to the first reduction gear assembly through a shaft, and installed in the rotary hinge part.

The rotation stop means comprises an external stopper formed on an external surface of the internal rotor, and an internal stopper formed on an internal surface of the rotary hinge part. The external stopper and internal stopper each preferably comprise two stoppers formed at positions spaced apart from each other at an angular interval of 180°.

The power transmission means comprises: a first cam member connected at a first end thereof to the power generating means, and tapered at a second end thereof to have a tapered projection; and a second cam member connected at a first end thereof to the fixed hinge part, and having a tapered depression at a second end thereof such that the tapered depression of the second cam member comes into engagement with the tapered projection of the first cam member.

The hinge device further comprises an elastic support means for applying an elastic biasing force to the power transmission means.

The elastic support means preferably comprises a compression spring installed in the fixed hinge part.

The reduction gear assembly comprises: a first reduction gear assembly connected to the motor; a second reduction gear assembly fixed to the rotary hinge part; and a third reduction gear assembly installed in the internal rotor and connected at a first end thereof to the first reduction gear assembly through a power transmitting unit, and connected at a second end thereof to the second reduction gear assembly through a shaft. The power transmitting unit comprises a timing belt or a gear train.

In another aspect, the present invention provides a hinge device for connecting a fold and a main body of a camera-equipped mobile phone to each other, comprising: a fixed hinge part provided at the main body; a rotary hinge part provided at the fold and hinged at both ends thereof to the fixed hinge part; an internal rotor provided in the rotary hinge part; a digital camera provided in the internal rotor; a motor provided in the fold to generate a rotating drive force; a first reduction gear assembly installed in the fold, and connected to the motor so as to transmit the rotating drive force of the motor while primarily lowering a rotating speed; a second reduction gear assembly connected to the first reduction gear assembly through a shaft, and installed in the rotary hinge part so as to transmit the rotating drive force of the motor while secondarily lowering the rotating speed; a rotation stop means for stopping rotation of the internal rotor and rotating the rotary hinge part using the rotating drive force of the motor; a power transmission means connected at both ends thereof to the second reduction gear assembly and the fixed hinge part, respectively, to selectively perform power transmission; and an elastic support means for applying an elastic biasing force higher than the rotating drive force of the motor to the power transmission means, and allowing the power transmission means to disengage from the motor when an external force is applied to the fold.

In a further aspect, the present invention provides a mobile phone comprising a hinge device having a fixed hinge part provided at a main body of the phone and a rotary hinge part provided at a fold of the phone, thus hinging the fold to the main body, the mobile phone comprising: an internal rotor provided in the rotary hinge part; a digital camera provided in the internal rotor; a power generating means provided in the internal rotor to generate a rotating drive force; a rotation stop means for stopping rotation of the internal rotor and rotating the rotary hinge part using the rotating drive force of the power generating means; a power transmission means connected at both ends thereof to the power generating means and the fixed hinge part, respectively, to selectively perform power transmission; an elastic support means for applying an elastic biasing force higher than the rotating drive force of the power generating means to the power transmission means, and allowing the power transmission means to disengage from the motor when an external force is applied to the fold; and a signal output means for outputting an electric signal to the power generating means.

In still another aspect, the present invention provides a mobile phone comprising, a hinge device having a fixed hinge part provided at a main body of the phone and a rotary hinge part provided at a fold of the phone, thus hinging the fold to the main body, the mobile phone comprising: an internal rotor provided in the rotary hinge part; a motor provided in the fold to generate a rotating drive force; a rotation stop means for stopping rotation of the internal rotor and rotating the rotary hinge part using the rotating drive force of the power generating means; a digital camera provided in the internal rotor; a reduction gear assembly used for transmitting the rotating drive force of the motor while lowering a rotating speed; a power transmission means connected at both ends thereof to the reduction gear assembly and the fixed hinge part, respectively, to selectively perform power transmission; an elastic support means for applying an elastic biasing force higher than the rotating drive force of the motor to the power transmission means, and allowing the power transmission means to disengage from the motor when an external force is applied to the fold; and a signal output means for outputting an electric signal to the motor.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
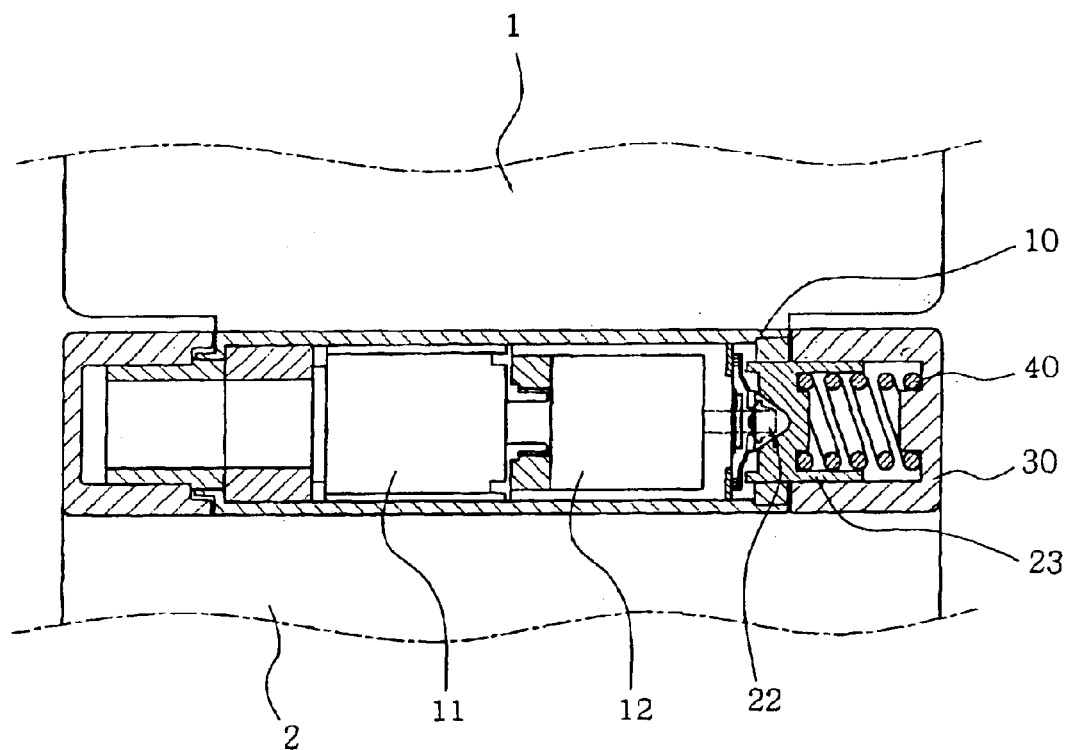
FIG. 1 is a sectional view of a conventional hinge device for camera-equipped mobile phones.

Reference should now be made to the drawings, in which the same reference numerals are used throughout the different drawings to designate the same or similar components.

Figure 2:
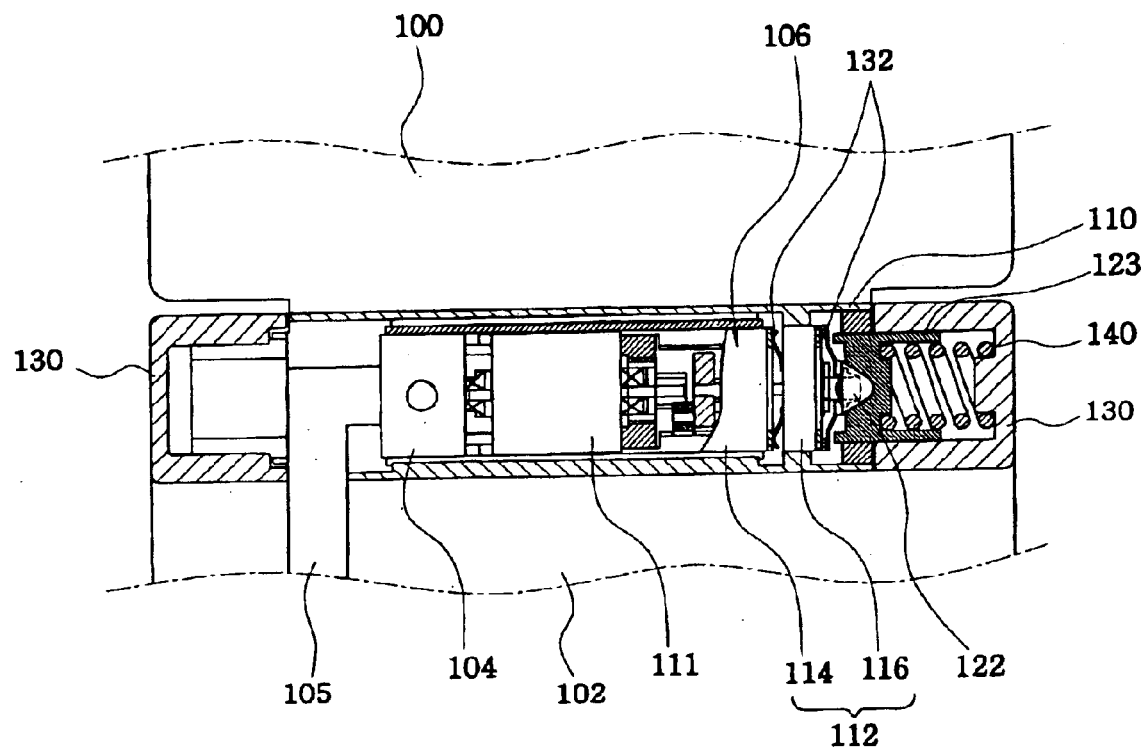
FIG. 2 is a sectional view showing the construction of a hinge device for camera-equipped mobile phones according to a primary embodiment of the present invention.

FIG. 2 is a sectional view of a hinge device for camera-equipped mobile phones according to a primary embodiment of the present invention. As shown in the drawing, the hinge device for folding-type mobile phones according to the present invention comprises a rotary hinge part 110 provided at a fold 100, and two fixed hinge parts 130 provided at a main body 102. The hinge device also has an internal rotor 106 installed in the rotary hinge part 110. A digital camera 104, which is an image pickup device for taking a photograph of a target subject, is fixedly installed in the internal rotor 106.

A fold and camera rotating mechanism is installed in the hinge device to automatically open or close the fold 100 relative to the main body 102 and rotate the camera 104. The rotating mechanism comprises a power generating means installed in the internal rotor 106 to generate a rotating drive force, and a rotation stop means for stopping the rotation of the internal rotor 106 and rotating the rotary hinge part 110 using the rotating drive force of the power generating means. The rotating mechanism also has a power transmission means, an elastic support means and a signal output means. The power transmission means is connected at both ends thereof to the power generating means and one of the two fixed hinge parts 130 such that the power transmission means selectively engages with the power generating means. The elastic support means applies an elastic biasing force to the power transmission means to selectively engage or disengage the power transmission means with or from the power generating means in response to an external force applied to the fold 100 by a user. The elastic biasing force of the elastic support means is higher than the rotating drive force of the power generating means. The signal output means outputs a control signal to the power generating means.

The rotary hinge part 110 is hinged at both ends thereof to the two fixed hinge parts 130, thus being rotated relative to the two fixed hinge parts 130.

The fold and camera rotating mechanism is installed in the rotary hinge part 110 to automatically open or close the fold 100 and automatically rotate the digital camera 104. In order to fabricate the fold and camera rotating mechanism, the internal rotor 106 is installed in the rotary hinge part 110, with the digital camera 104 fixedly installed in the internal rotor 106.

The internal rotor 106 has a cylindrical shape similar to that of the rotary hinge part 110, and the digital camera 104 is installed in an end of the internal rotor 106.

An FPC 105 is connected to a first end of the camera 106, and transceives electric signals with a PCB (not shown) of the main body 102.

The power generating means is installed in the internal rotor 106 at a position around a second end of the camera 104, and generates the rotating drive force for rotating the camera 104 and the fold 100. The power generating means comprises a motor 111, and a reduction gear assembly 112 for transmitting the rotating drive force of the motor 111 while lowering the rotating speed.

The motor 111 comprising a micro-motor is connected to the signal output means (not shown) externally provided at a predetermined position of the main body 102, and is turned on by electricity applied from a battery of the mobile phone in response to a signal outputted from the signal output means. The motor 111 thus generates an opposite directional rotating force.

The reduction gear assembly 112 is assembled with the output shaft of the motor 111, and transmits the rotating drive force of the motor 111 to the power transmission means while lowering the rotating speed at a predetermined ratio. The reduction gear assembly 112 comprises a plurality of planetary gears.

The planetary gears of the reduction gear assembly are assembled to have a predetermined reduction ratio, and function to prevent undesired reverse rotation of the reduction gear assembly, in addition to lowering the rotating speed.

In the preferred embodiments of the present invention, the power generating means comprises the micro-motor 111 and the reduction gear assembly 112. However, it should be understood that the power generating means may be designed to have another type of mechanism if the mechanism stably generates a desired rotating drive force and functions to prevent undesired reverse rotation of the fold and camera.

In the embodiment of the present invention, the reduction gear assembly 112 comprises a first reduction gear assembly 114 and a second reduction gear assembly 116. The first reduction gear assembly 114 is installed in an end of the internal rotor 106, and is connected to the motor 111 to primarily reduce the rotating speed of the rotating force of the motor 111. The second reduction gear assembly 116 is connected to the first reduction gear assembly 114 through a shaft, and is connected to the rotary hinge part 110 to secondarily reduce the rotating speed of the rotating force transmitted from the first reduction gear assembly 114.

Figure 3:
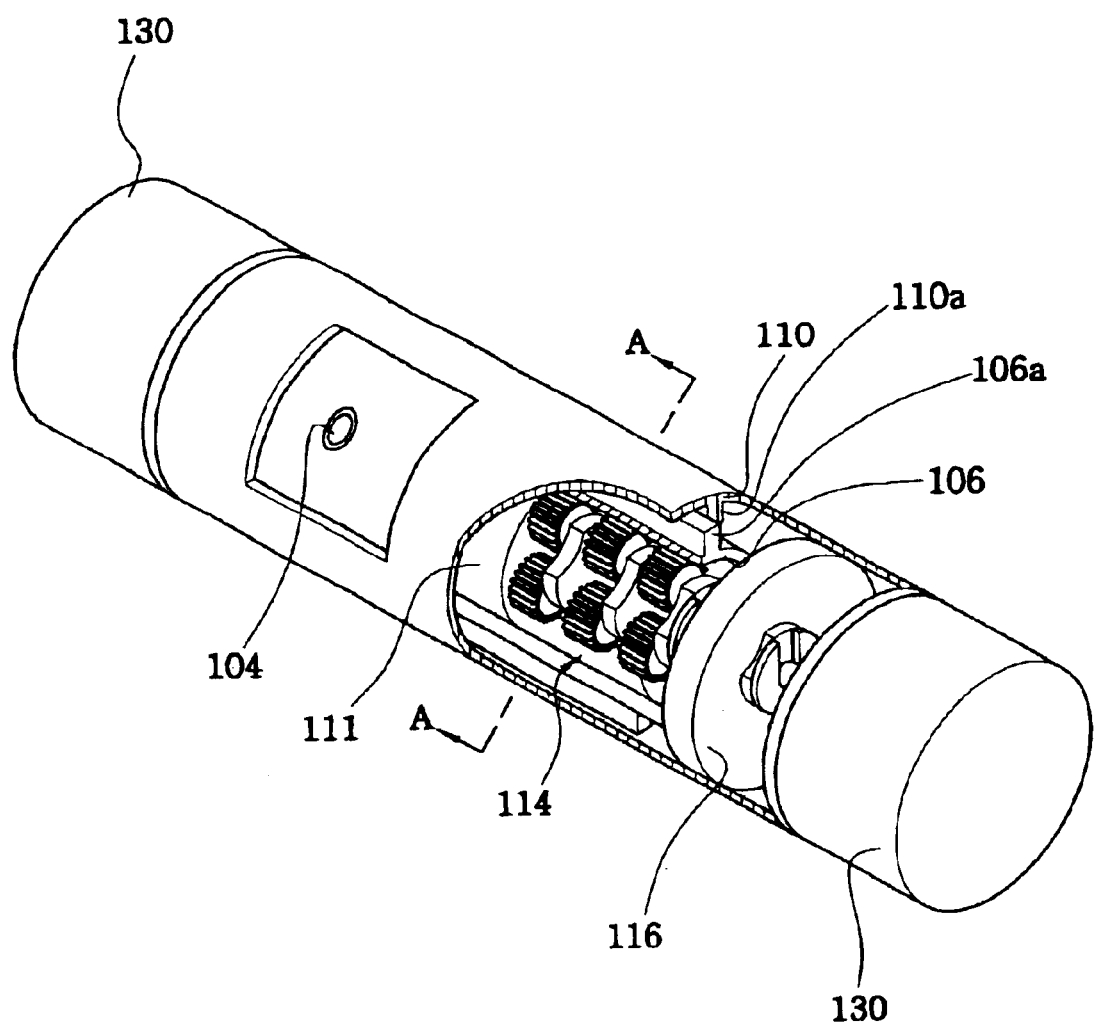
FIG. 3 is a partially broken perspective view showing the construction of the hinge device according to the present invention.

FIG. 3 is a partially broken perspective view showing the construction of the hinge device according to the present invention. As shown in the drawing, the first reduction gear assembly 114 according to the embodiment of the invention comprises three-stage planetary gear units However, it should be understood that the first reduction gear assembly 114 is not limited to the three-stage planetary gear units, but the number of stages of the gear units may be changed in accordance with a designed reduction ratio of the first reduction gear assembly 114 without affecting the functioning of the present invention.

Figure 4:
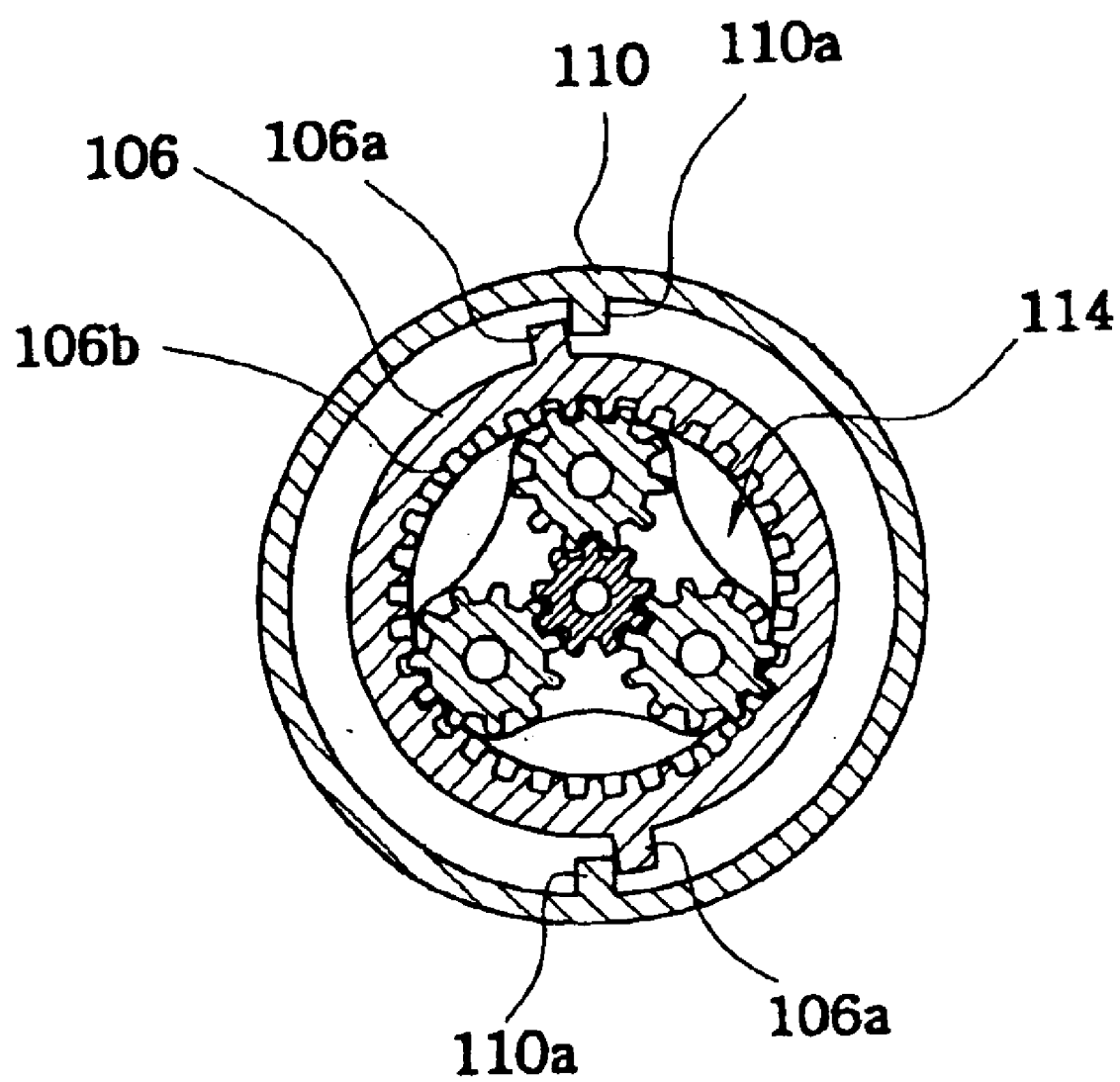
FIG. 4 is a sectional view taken along the line A—A of FIG. 3.

The first reduction gear assembly 114 is configured such that the three-stage planetary gear units of the gear assembly 114 are rotated while engaging with an internal surface of the internal rotor 106 which houses the digital camera 104 and the motor 111. That is, a part of the internal rotor 106 is designed as an internal gear having gear teeth 106b, at which the internal rotor 106 internally engages with the planetary gears of the first reduction gear assembly 114 as shown in FIG. 4.

Since the planetary gears of the first reduction gear assembly 114 are rotated while externally engaging with the internal gear teeth 106b of the internal rotor 106, the internal rotor 106 is rotated, so the digital camera 104 fixedly installed in the internal gear 106 is rotated in a desired direction.

The second reduction gear assembly 116 comprises a single-stage planetary gear unit. The reduction gear assembly 112 thus lowers the rotating speed of the motor's rotating force while changing the reduction ratio within first to fourth stages. The second reduction gear assembly 116 is fixed to the rotary hinge part 110.

The rotation stop means, used for stopping the rotation of the internal rotor 106 and rotating the rotary hinge part 110 using the rotating drive force of the power generating means, is provided at both the internal rotor 106 and the rotary hinge part 110. In the preferred embodiments of the present invention, the rotation stop means comprises external stoppers 106a formed on the external surface of the internal rotor 106, and internal stoppers 110a formed on the internal surface of the rotary hinge part 110.

The external stoppers 106a and the internal stoppers 110a are preferably configured as longitudinal stop projections having predetermined widths, and each preferably comprise two longitudinal projections formed at positions spaced apart from each other at an angular interval of 180°, as shown in FIG. 4.

However, it should be understood that the shape and number of the external and internal stoppers 106a and 110a are not limited to the above-mentioned shape and number, but may be somewhat freely changed without affecting the functioning of the present invention if the stoppers 106a and 110a stop the rotation of the internal rotor 106 and rotate the rotary hinge part 110 using the rotating drive force of the power generating means.

In the hinge device of the present invention, the power transmission means selectively engages with or disengages from the power generating means. The power transmission means comprises a first cam member 122 and a second cam member 123. The first can member 122 is connected at a first end thereof to the second reduction gear assembly 116, and is tapered at a second end thereof to have a tapered projection projecting toward the second cam member 123. The second cam member 123 is connected at a first end thereof to one of the two fixed hinge parts 130, and has a tapered depression at a second end thereof such that the second cam member 123 comes into frictional engagement with the first cam member 122.

When the rotating drive force of the power generating means is applied to the first cam member 122 during an automatic rotating mode wherein the first cam member 122 frictionally engages with the second cam member 123 biased toward the first cam member 122 by the elastic biasing force of the elastic support means, the second cam member 123 is rotated in the same direction as that of the first cam member 122 due to the frictional engagement of the two cam members 122 and 123. However, when a user manually opens or closes the fold 100, and applies an external force to the fold 100 when the rotating mechanism is maintained in the automatic rotating mode, the first and second cam members 122 and 123 disengage from each other.

In the present invention, it should be understood that the first cam member 122 may be provided with a tapered depression, and the second cam member 123 may be provided with a tapered projection for frictionally engaging with the tapered depression of the first cam member 122, different from the preferred embodiment, without affecting the functioning of the present invention.

The elastic support means applies its elastic biasing force to the power transmission means, and allows the power transmission means to disengage from the power generating means when an external force is applied to the fold 100. The rotating mechanism also has a position sensing means for sensing an angular position of the rotary hinge part 110 and outputting a control signal to the power generating means.

The elastic support means comprises a compression spring 140 made of a material having both high elastic strain and high restoring force. The compression spring 140 is set in a cavity of one of the fixed hinge parts 130 such that a first end of the spring is connected to an end wall of the cavity, and a second end is connected to the second cam member 123 of the power transmission means.

The elastic biasing force of the elastic support means is higher than the rotating drive force of the power generating means. Since the elastic support means having such a high elastic biasing force biases the power transmission means in a direction, the first and second cam members 122 and 123 of the power transmission means engage with or disengage from each other.

That is, when the fold 100 is opened or closed by the rotating drive force of the power generating means, the compression spring 140 applies its elastic biasing force higher than the rotating drive force of the power generating means to the power transmission means, thus maintaining the frictional engaging state of the first and second cam members 122 and 123. However, when the user manually opens or closes the fold 100, the compression spring 140 is elastically deformed to allow the fold 100 to be manually opened or closed.

In the drawings, the reference numeral 132 denotes two sensor brushes which are installed in the rotary hinge part 110 to respectively sense rotation of the digital camera 104 and rotation of the fold 100.

In the operation of the mobile phone having the hinge device, a motor drive chip of the PCB installed in the mobile phone separately controls the motor 111 in two modes, that is, a fold rotating mode and a camera rotating mode.

The above-mentioned hinge device for the mobile phones of the present invention is operated as follows.

When a user manually rotates the fold 100 in either direction to open or close the fold 100 relative to the main body 102, the rotary hinge part 110 is rotated in the same direction in cooperation with the rotation of the fold 100.

In such a case, a manual rotating force applied to the rotary hinge part 110 by the user is higher than the elastic biasing force of the compression spring 140, the first and second cam members 122 and 123 slip off to disengage from each other.

That is, the second cam member 123 biased at the end thereof by the compression spring 140 is designed to selectively come into frictional engagement with the first cam member 122 mounted to the shaft of the reduction gear assembly 112. Therefore, when an external force is applied to the fold 100 by the user to manually open or close the fold 100, the first and second cam members 122 and 123 slip off to disengage from each other since the external force acting on the fold 100 is higher than the elastic biasing force of the compression spring 140. The power transmission means retracts after compressing the compression spring 140, so it is possible for the user to manually open or close the fold 100.

When the user wants to automatically open the fold 100, the user manipulates the signal output means of the main body 102. The signal output means thus outputs an electric signal to the power generating means.

In response to the signal outputted from the signal output means, the motor 111 of the power generating means is turned on by electricity applied from the battery of the mobile phone, thus being rotated in a direction and generating a desired directional rotating force capable of automatically opening the fold 100. The rotating force of the motor 111 is primarily transmitted to the first reduction gear assembly 114.

Figure 5:
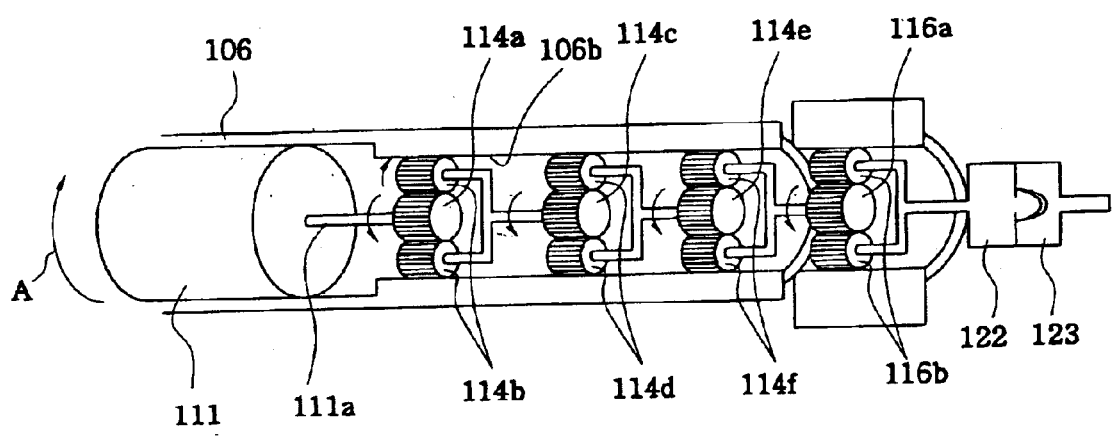
FIG. 5 is a perspective view showing the operation of a reduction gear assembly installed in the hinge device of the present invention.

FIG. 5 is a perspective view showing the operation of the reduction gear assembly installed in the hinge device of the present invention. This drawing shows the case where the rotating drive force of the motor 111 rotates the first and second cam members 114 and 116, the internal rotor 106, and the rotary hinge part 110.

In FIG. 5, the number of planetary gears of each stage gear unit of the reduction gear assembly 112 engaging with a sun gear is two, for ease of illustration. It should thus be understood that the number of the planetary gears of each stage gear unit engaging with the sun gear is not limited to the two, but may be changed without affecting the functioning of the present invention.

When the motor 111 is turned on to be rotated, the rotating drive force of the motor 111 is transmitted to a first-stage sun gear 114a through the output shaft 111a of the motor. The first-stage sun gear 114a is thus rotated, and forcibly rotates the first-stage planetary gears 114b engaging with the first-stage sun gear 114a.

In such a case, the first-stage planetary gears 114b externally engage with the gear teeth 106b of the internal gear of the internal rotor 106, and the internal rotor 106 fixedly houses the motor 111, so the first-stage planetary gears 114b rotate on their axes of rotation and revolve around the sun gear 114a while moving along the gear teeth 106b of the internal rotor 106. Therefore, a second-stage sun gear 114c connected through a shaft to the first-stage planetary gears 114b is rotated.

When the first-stage sun gear 114a of FIG. 5 is rotated counterclockwise, the first-stage planetary gears 114b are rotated clockwise on their axes of rotation, and revolve around the sun gear 114a counterclockwise while moving along the gear teeth 106b of the internal rotor 106. Therefore, the second-stage sun gear 114c is rotated counterclockwise.

When the second-stage sun gear 114c is rotated as described above, second-stage planetary gears 114d externally engaging with the second-stage sun gear 114c rotate on their axes of rotation and revolve around the second-stage sun gear 114c while moving along the gear Teeth 106b of the internal rotor 106. Therefore, a third-stage sun gear 114e connected to the second-stage planetary gears 114d through a shaft is rotated.

In the reduction gear assembly, a fourth-stage sun gear 116a is connected through a shaft to third-stage planetary gears 114f externally engaging with the third-stage sun gear 114e. In such a case, the fourth-stage sun gear 116a externally engages with fourth-stage planetary gears 116b fixed to the first cam member 122, so the third-stage planetary gears 114f do not revolve around the third-stage sun gear 114e. The internal rotor 106 acting as the internal gear is thus rotated in a reverse direction.

Therefore, the internal rotor 106 is rotated in a direction as shown by the arrow A of FIG. 5, so the motor 111 and the digital camera 104 fixedly set in the internal rotor 106 are rotated in the same direction.

When the external stoppers 106a formed on the external surface of the internal rotor 106 come into contact with the internal stoppers 110a formed on the internal surface of the rotary hinge part 110 during the rotation of the internal rotor 106, the rotation of the internal rotor 106 is stopped.

When the motor 111 is further rotated under the state that the external stoppers 106a of the internal rotor 106 come into contact with the internal stoppers 110a of the rotary hinge part 110, the third-stage planetary gears 114f revolve around the third-stage sun gear 114e while moving along the gear teeth 106b of the internal rotor 106 and rotate the sun gear 116a of the second reduction gear assembly 116 to cause the planetary gears 116b of the second reduction gear assembly 116 to rotate and revolve. However, the planetary gears 116b of the second reduction gear assembly 116 are fixed to the first cam member 122, so the planetary gears 116b do not revolve. Therefore, the internal rotor 106 acting as the internal gear is rotated in a reverse direction.

The rotary hinge part 110 fixed to the second reduction gear assembly 116 is thus rotated, so the fold 100 integrated with the rotary hinge part 110 is rotated in the same direction to be opened.

FIGS. 6a to 6d are side views showing the operation of the fold and camera rotating mechanism included in the hinge device of the present invention. The operation of the fold and camera rotating mechanism to rotate the digital camera 104 and the fold 100 will be described with reference to FIGS. 6a to 6d.

Figure 6A:
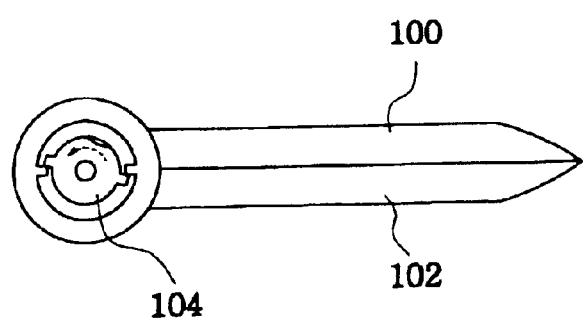
FIGS. 6a to 6d are side views showing the operation of a fold and camera rotating mechanism included in the hinge device of the present invention.

When the motor 111 is rotated in a direction, the digital camera 104 is rotated in the same direction by the rotating force of the motor 111. During the rotation of the digital camera 104, the external stoppers 106a of the internal rotor 106 fixedly housing the digital camera 104 come into contact with the internal stoppers 110a of the rotary hinge part 110, as shown in FIG. 6a.

Figure 6B:
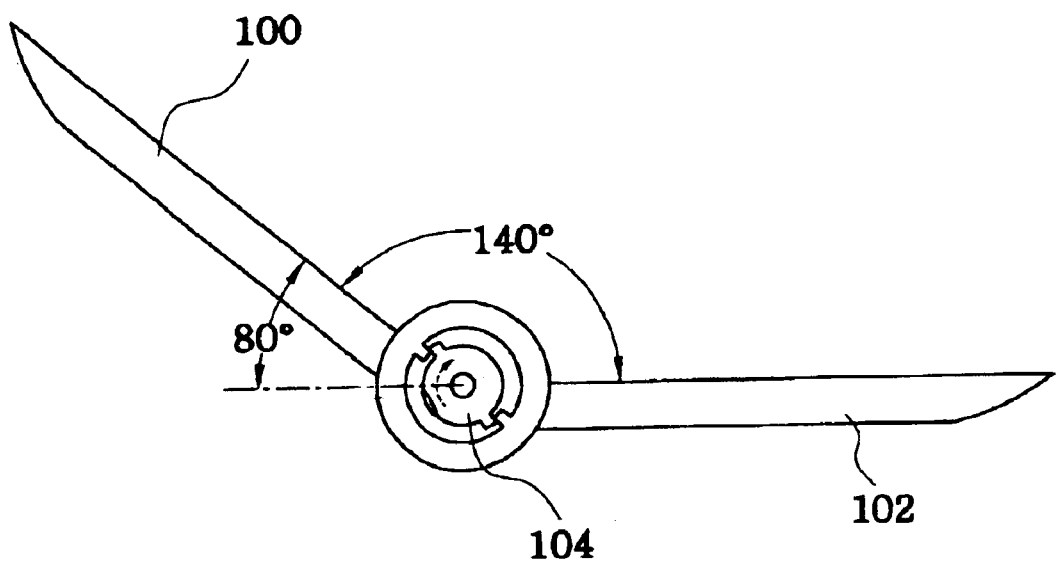

When the motor 111 is further rotated under the state that the external stoppers 106a come into contact with the internal stoppers 110a, the fold 100 is rotated and opened, as shown in FIG. 6b.

In such a case, the digital camera 104 faces a target subject situated opposite to the user of the mobile phone.

The opened angle of the fold 100 relative to the main body 102 is preferably set to about 140°, and the angle between the fold 100 and the digital camera 104 is preferably set to about 80°.

Figure 6C:
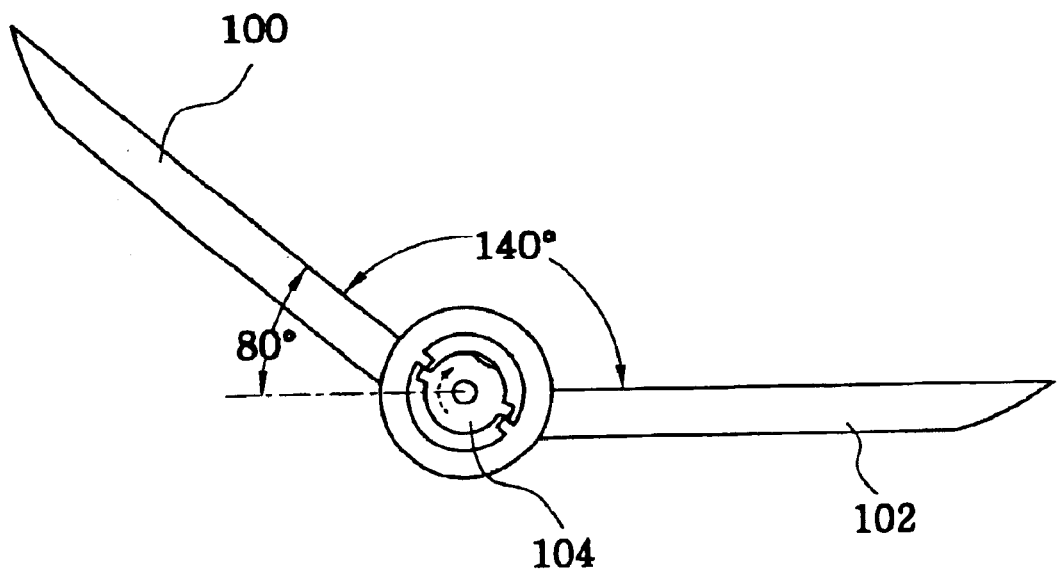

When the fold 100 is opened as described above, it is possible to change the photographing direction of the camera 104 by appropriately rotating the motor 111 in a reverse direction. That is, in order to direct the camera 104 toward The user of the phone, the motor 111 is rotated at a desired angle in the reverse direction as shown in FIG. 6c.

After taking a photograph of the user, the motor 111 is rotated in the direction opposite to the reverse direction.

Figure 6D:
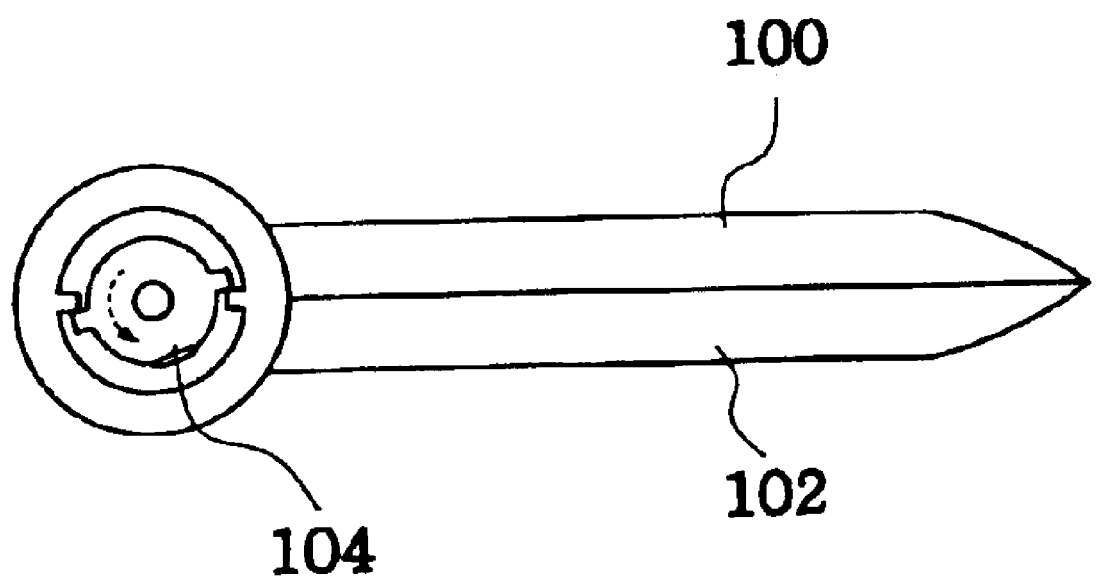

During the rotation of the digital camera 104, the external stoppers 106a of the internal rotor 106 fixedly housing the digital camera 104 come into contact with the internal stoppers 110a of the rotary hinge part 110. When the motor 111 is, further rotated in the same direction, the fold 100 is rotated and closed as shown in FIG. 6d.

Figure 7:
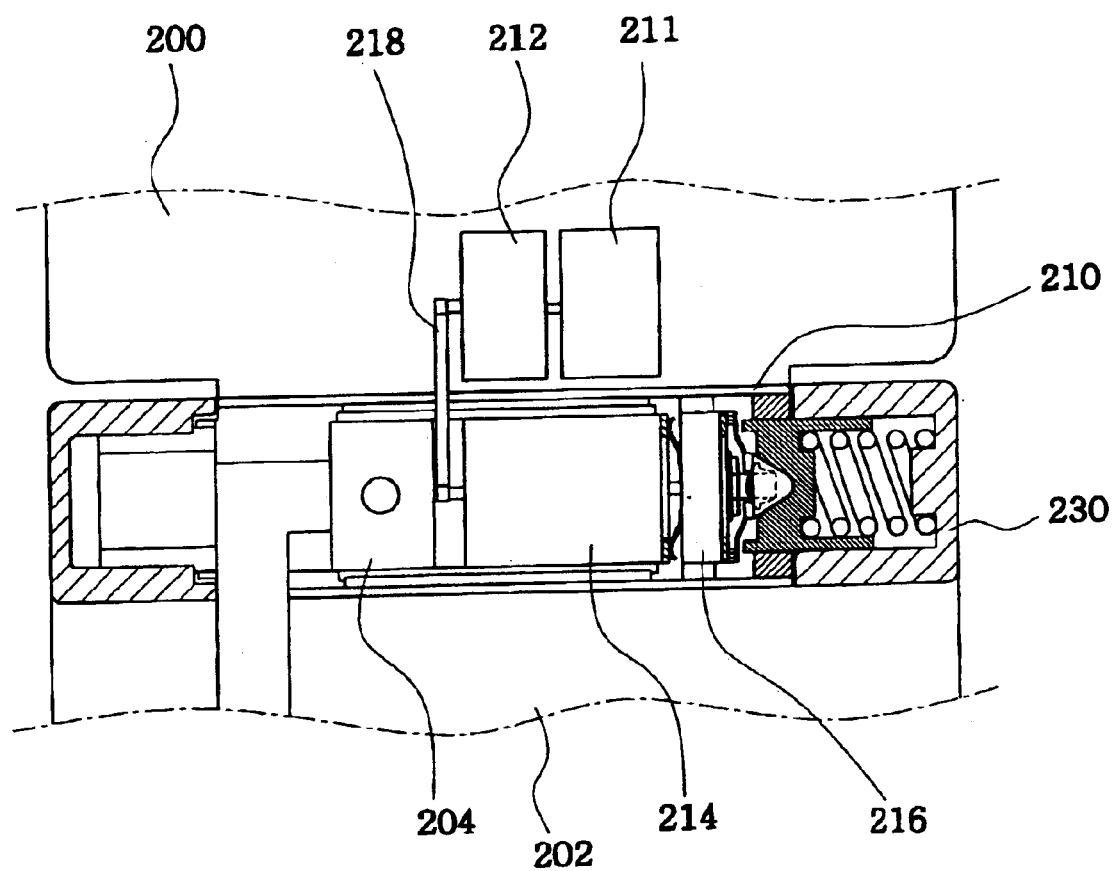
FIG. 7 is a sectional view showing the construction of a hinge device for camera-equipped mobile phones according to a second embodiment of the present invention.

FIG. 7 is a sectional view showing the construction of a hinge device for camera-equipped mobile phones according to a second embodiment of the present invention. As shown in the drawing, the hinge device for folding-type mobile phones according to the second embodiment of the present invention comprises a rotary hinge part 210 provided at a fold 200, and two fixed hinge parts 230 provided at a main body 202. An internal rotor is set in the rotary hinge part 210, with a digital camera 204 installed in the internal rotor.

A motor 211 for rotating the internal rotor is installed in a space under the LCD of the fold 200. The hinge device also has a reduction gear assembly for transmitting the rotating drive force of the motor 211 while lowering the rotating speed.

In the second embodiment, the reduction gear assembly comprises a first reduction gear assembly 212 connected to the motor 211. A third reduction gear assembly 214 is installed in the internal rotor, and is connected to the first reduction gear assembly 212 through a power transmitting unit 218. A second reduction gear assembly 216 is connected to the third reduction gear assembly 214 through a shaft and is fixed to the rotary binge part 210.

In the second embodiment, a timing belt or a gear train may be preferably used as the power transmitting unit 218. However, it should be understood that the power transmitting unit 218 is not limited to the timing-belt or the gear train.

The hinge device according to the second embodiment of the present invention is operated as follows. When the motor 211 is rotated, the first reduction gear assembly 212 primarily lowers the rotating speed of the rotating force outputted from the motor 211. The rotating force is, thereafter, transmitted from the first reduction gear assembly 212 to the third reduction gear assembly 214 through the power transmitting unit 218.

The third reduction gear assembly 214 and the second reduction gear assembly 216 are thus operated in the same manner as that described for the primary embodiment to rotate the digital camera 204 and the fold 200, and further explanation of the operation of the two reduction gear assemblies 214 and 216 to rotate the camera 204 and the fold 200 is not deemed necessary.

The hinge device according to the second embodiment thus automatically opens or closes the fold of a mobile phone and automatically rotates she digital camera.

Figure 8:
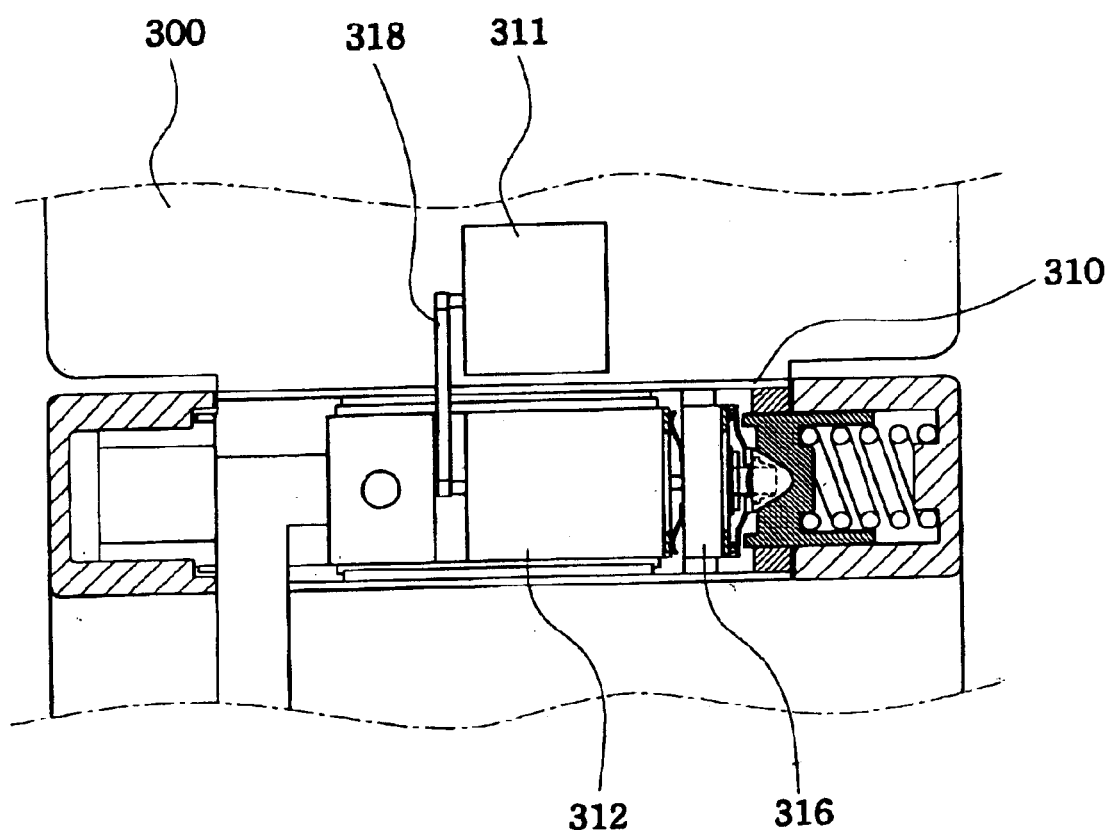
FIG. 8 is a sectional view showing the construction of a hinge device for camera-equipped mobile phones according to a third embodiment of the present invention.

FIG. 8 is a sectional view showing the construction of a hinge device for camera-equipped mobile phones according to a third embodiment of the present invention. As shown in the drawing, the hinge device for folding-type mobile phones according to the third embodiment of the present invention comprises a motor 311 installed in a space under the LCD of the fold 300 to rotate an internal rotor. The hinge device also has a reduction gear assembly for transmitting the rotating drive force of the motor 311 while lowering the rotating speed. In the third embodiment, the reduction gear assembly comprises a first reduction gear assembly 312 installed in the internal rotor, a power transmitting unit 318 connecting the first reduction gear assembly 312 to the motor 311, and a second reduction gear assembly 316 connected through a shaft to the first reduction gear assembly 312 and fixed to a rotary hinge part 310.

In the same manner as that described for the second embodiment, a timing belt or a gear train may be preferably used as the power transmitting unit 318 of the third embodiment.

When the motor 311 is rotated, the rotating force of the motor 311 is transmitted to the first reduction gear assembly 312, thus rotating the first reduction gear assembly 312. In such a case, the first reduction gear assembly 312 primarily lowers the rotating speed of the rotating force outputted from the motor 311.

During the operation of the hinge device according to the third embodiment, the first reduction gear assembly 312 and the second reduction gear assembly 316 are operated in the same manner as that described for the primary embodiment to rotate a digital camera and the fold 300. Further explanation of the operation of the two reduction gear assemblies 312 and 316 to rotate the camera and the fold 300 is thus not deemed necessary.

INDUSTRIAL APPLICABILITY

As described above, the present invention provides a hinge device for camera-equipped mobile phones, which is designed to allow the fold of a mobile phone to be automatically opened or closed relative to the main body, and allow automatic rotation of a digital camera of the phone. The present invention also provides a mobile phone having such a hinge device. The camera-equipped mobile phones having the hinge devices are very convenient to users.

In the hinge device of the present invention, the mechanism for rotating the fold and the camera of the mobile phone does not use separate motors to rotate the fold and the camera, but is designed to rotate the fold and the camera at the same time using a single motor. The hinge device thus automatically rotates the fold and the camera using the simple mechanism which comprises the reduced number of parts capable of reducing the production cost of camera-equipped mobile phones.

The hinge device of the present invention also enhances the functions of camera-equipped mobile phones, such as models of IMT-2000, designed to allow users to transceive images and sound with call-connected counterparts through the mobile phones, and store image and voice data in the data storage devices of the phones.

Although the preferred embodiments of the present invention have been disclosed for illustrative purposes, those skilled in the art will appreciate that various modifications, additions and substitutions are possible, without departing spirit of the invention as disclosed in the accompanying claims.

What is claimed is:

1. A hinge device for connecting a fold and a main body of a camera-equipped mobile phone to each other, comprising:
    a fixed hinge part provided at said main body;
    a rotary hinge part provided at said fold and hinged at both ends thereof to said fixed hinge part;
    power generating means provided in said fold to generate a rotating drive force;
    an internal rotor provided in said rotary hinge part to be rotated by the rotating drive force generated by the power generating means;
    an image pickup device provided in said internal rotor to take a photograph of a target subject;
    rotation stop means for stopping rotation of said internal rotor and rotating said rotary hinge part using the rotating drive force of the power generating means; and
    power transmission means connected at both ends thereof to the power generating means and the fixed hinge part, respectively, to selectively perform power transmission.

2. The hinge device according to claim 1, wherein said power generating means comprises a motor which is rotated in either direction to generate a forward or reverse directional rotating force.

3. The hinge device according to claim 2, wherein said power generating means further comprises a reduction gear assembly connected to said motor so as to transmit the rotating drive force of the motor while lowering a rotating speed.

4. The hinge device according to claim 3, wherein said reduction gear assembly comprises:
    a first reduction gear assembly installed in said internal rotor; and
    a second reduction gear assembly connected to said first reduction gear assembly through a shaft, and installed in said rotary hinge part.

5. The hinge device according to claim 1, wherein said rotation stop means comprises an external stopper formed on an external surface of said internal rotor, and an internal stopper formed on an internal surface of said rotary hinge part.

6. The hinge device according to claim 5, wherein said external stopper and internal stopper each comprise two stoppers formed at positions spaced apart from each other at an angular interval of 180°.

7. The hinge device according to claim 1, wherein said power transmission means comprises:
    a first cam member connected at a first end thereof to said power generating means, and tapered at a second end thereof to have a tapered projection; and
    a second cam member connected at a first end thereof to the fixed hinge part, and having a tapered depression at a second end thereof such that the tapered depression of the second cam member comes into engagement with the tapered projection of the first cam member.

8. The hinge device according to claim 1, further comprising elastic support means for applying an elastic biasing force to the power transmission means.

9. The hinge device according to claim 8, wherein said elastic support means comprises a compression spring installed in said fixed hinge part.

10. The hinge device according to claim 3, wherein said reduction gear assembly comprises:
    a first reduction gear assembly connected to said motor;
    a second reduction gear assembly fixed to said rotary hinge part; and
    a third reduction gear assembly installed in said internal rotor and connected at a first end thereof to said first reduction gear assembly through a power transmitting unit, and connected at a second end thereof to said second reduction gear assembly through a shaft.

11. The hinge device according to claim 10, wherein said power transmitting unit comprises a timing belt or a gear train.

12. A hinge device for connecting a fold and a main body of a camera-equipped mobile phone to each other, comprising:
    a fixed hinge part provided at said main body;
    a rotary hinge part provided at said fold and hinged at both ends thereof to said fixed hinge part;
    an internal rotor provided in said rotary hinge part;

a digital camera provided in said internal rotor;

a motor provided in said fold to generate a rotating drive force;

a first reduction gear assembly installed in said fold, and connected to said motor so as to transmit the rotating drive force of the motor while primarily lowering a rotating speed;

a second reduction gear assembly connected to said first reduction gear assembly through a shaft, and installed in said rotary hinge part so as to transmit the rotating drive force of the motor while secondarily lowering the rotating speed;

rotation stop means for stopping rotation of said internal rotor and rotating said rotary hinge part using the rotating drive force of the motor;

power transmission means connected at both ends thereof to the second reduction gear assembly and the fixed hinge part, respectively, to selectively perform power transmission; and elastic support means for applying an elastic biasing force higher than the rotating drive force of the motor to the power transmission means, and allowing the power transmission means to disengage from the motor when an external force is applied to the fold.

13. The hinge device according to claim 12, wherein a third reduction gear assembly for connecting the first reduction gear assembly to the second reduction gear assembly is installed in said internal rotor, said third reduction gear assembly being connected to the first reduction gear assembly through a power transmitting unit.

14. The hinge device according to claim 13, wherein said power transmitting unit comprises a timing belt or a gear train.

15. The hinge device according to claim 12, wherein said rotation stop means comprises an external stopper formed on an external surface of said internal rotor, and an internal stopper formed on an internal surface of said rotary hinge part.

16. The hinge device according to claim 15, wherein said external stopper and internal stopper each comprise two stoppers formed at positions spaced apart from each other at an angular interval of 180°.

17. The hinge device according to claim 12, wherein said power transmission means comprises:

a first cam member connected at a first end thereof to said second reduction gear assembly, and tapered at a second end thereof to have a tapered projection; and a second cam member connected at a first end thereof to the fixed hinge part, and having a tapered depression at a second end thereof such that the tapered depression of the second cam member comes into engagement with the tapered projection of the first cam member.

18. The hinge device according to claim 12, wherein said elastic support means comprises a compression spring installed in said fixed hinge part.

19. The hinge device according to claim 12, further comprising sensor brushes for respectively sensing rotation of the digital camera and rotation of the fold.

20. A mobile phone comprising a hinge device having a fixed hinge part provided at a main body of the phone and a rotary hinge part provided at a fold of the phone, thus hinging the fold to the main body, said mobile phone comprising:

an internal rotor provided in said rotary hinge part;

a digital camera provided in said internal rotor;

power generating means provided in said internal rotor to generate a rotating drive force;

rotation stop means for stopping rotation of said internal rotor and rotating said rotary hinge part using the rotating drive force of the power generating means;

power transmission means connected at both ends thereof to the power generating means and the fixed hinge part, respectively, to selectively perform power transmission;

elastic support means for applying an elastic biasing force higher than the rotating drive force of the power generating means to the power transmission means, and allowing the power transmission means to disengage from the motor when an external force is applied to the fold; and signal output means for outputting an electric signal to the power generating means.

21. The mobile phone according to claim 20, wherein said power generating means comprises a motor which is rotated in either direction to generate a forward or reverse directional rotating force.

22. The mobile phone according to claim 21, wherein said power generating means further comprises a reduction gear assembly connected to said motor so as to transmit the rotating drive force of the motor while lowering a rotating speed.

23. The mobile phone according to claim 22, wherein said reduction gear assembly comprises:

a first reduction gear assembly installed in said internal rotor; and a second reduction gear assembly connected to said first reduction gear assembly through a shaft, and installed in said rotary hinge part.

24. The mobile phone according to claim 20, wherein said rotation stop means comprises an external stopper formed on an external surface of said internal rotor, and an internal stopper formed on an internal surface of said rotary hinge part.

25. The mobile phone according to claim 24, wherein said external stopper and internal stopper each comprise two stoppers formed at positions spaced apart from each other at an angular interval of 180°.

26. The mobile phone according to claim 20, wherein said power transmission means comprises:

a first cam member connected at a first end thereof to said power generating means, and tapered at a second end thereof to have a tapered projection; and a second cam member connected at a first end thereof to the fixed hinge part, and having a tapered depression at a second end thereof such that the tapered depression of the second cam member comes into engagement with the tapered projection of the first cam member.

27. The mobile phone according to claim 20, wherein said elastic support means comprises a compression spring installed in said fixed hinge part.

28. The mobile phone according to claim 20, further comprising sensor brushes for respectively sensing rotation of the digital camera and rotation of the fold.

29. A mobile phone comprising a hinge device having a fixed hinge part provided at a main body of the phone and a rotary hinge part provided at a fold of the phone, thus hinging the fold to the main body, said mobile phone comprising:

an internal rotor provided in said rotary hinge part;

a motor provided in said fold to generate a rotating drive force;

rotation stop means for stopping rotation of said internal rotor and rotating said rotary hinge part using the rotating drive force of the motor;

a digital camera provided in said internal rotor;

a reduction gear assembly used for transmitting the rotating drive force of the motor while lowering a rotating speed;

power transmission means connected at both ends thereof to the reduction gear assembly and the fixed hinge part, respectively, to selectively perform power transmission;

elastic support means for applying an elastic biasing force higher than the rotating drive force of the motor to the power transmission means, and allowing the power transmission means to disengage from the motor when an external force is applied to the fold; and signal output means for outputting an electric signal to the motor.

30. The mobile phone according to claim 29, wherein said reduction gear assembly comprises:

a first reduction gear assembly connected to said motor;

a second reduction gear assembly fixed to said rotary hinge part; and a third reduction gear assembly installed in said internal rotor and connected at a first end thereof to said first reduction gear assembly through a power transmitting unit, and connected at a second end thereof to said second reduction gear assembly through a shaft.

31. The mobile phone according to claim 30, wherein said power transmitting unit comprises a timing belt or a gear train.

32. The mobile phone according to claim 29, wherein said reduction gear assembly comprises:

a first reduction gear assembly installed in said internal rotor, and connected to said motor through a power transmitting unit; and a second reduction gear assembly fixed to said rotary hinge part, and connected to said first reduction gear assembly through a shaft.

33. The mobile phone according to claim 32, wherein said power transmitting unit comprises a timing belt or a gear train.

34. The mobile phone according to claim 29, wherein said reduction gear assembly comprises:

a first reduction gear assembly connected to said motor; and a second reduction gear assembly fixed to said rotary hinge part, and connected to said first reduction gear assembly through a power transmitting unit.

35. The mobile phone according to claim 34, wherein said power transmitting unit comprises a timing belt or a gear train.

36. The mobile phone according to claim 29, wherein said rotation stop means comprises an external stopper formed on an external surface of said internal rotor, and an internal stopper formed on an internal surface of said rotary hinge part.

37. The mobile phone according to claim 36, wherein said external stopper and internal stopper each comprise two stoppers formed at positions spaced apart from each other at an angular interval of 180°.

38. The mobile phone according to claim 29, wherein said power transmission means comprises:

a first cam member connected at a first end thereof to said motor, and tapered at a second end thereof to have a tapered projection; and a second cam member connected at a first end thereof to the fixed hinge part, and having a tapered depression at a second end thereof such that the tapered depression of the second cam member comes into engagement with the tapered projection of the first cam member.

39. The mobile phone according to claim 29, wherein said elastic support means comprises a compression spring installed in said fixed hinge part.

40. The mobile phone according to claim 29, further comprising sensor brushes for respectively sensing rotation of the digital camera and rotation of the fold.

* * * * *